(12) United States Patent
Maine

(10) Patent No.: US 7,380,115 B2
(45) Date of Patent: May 27, 2008

(54) TRANSFERRING DATA USING DIRECT MEMORY ACCESS

(75) Inventor: Gene Maine, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 442 days.

(21) Appl. No.: 10/484,460

(22) PCT Filed: Nov. 7, 2002

(86) PCT No.: PCT/US02/35786

§ 371 (c)(1),
(2), (4) Date: Jan. 15, 2004

(87) PCT Pub. No.: WO03/043254

PCT Pub. Date: May 22, 2003

(65) Prior Publication Data

US 2004/0186931 A1    Sep. 23, 2004

Related U.S. Application Data

(60) Provisional application No. 60/332,415, filed on Nov. 9, 2001.

(51) Int. Cl.
G06F 12/08    (2006.01)
(52) U.S. Cl. .............................. 713/2; 710/22; 710/23; 710/24; 710/25; 710/26; 710/27; 710/28; 711/161; 711/162
(58) Field of Classification Search .................... 713/2; 711/161, 162; 710/22–28
See application file for complete search history.

(56) References Cited

U.S. PATENT DOCUMENTS

| 4,217,486 A | 8/1980 | Tawfik et al. |
| 4,428,044 A | 1/1984 | Liron |
| 5,159,671 A | 10/1992 | Iwami |
| 5,345,565 A | 9/1994 | Jibbe et al. |
| 5,483,528 A | 1/1996 | Christensen |
| 5,530,842 A | 6/1996 | Abraham et al. |
| 5,590,377 A | 12/1996 | Smith |
| 5,619,642 A | 4/1997 | Nielson et al. |
| 5,668,956 A | 9/1997 | Okazawa et al. |

(Continued)

FOREIGN PATENT DOCUMENTS

EP    0800138 A1    10/1997

(Continued)

OTHER PUBLICATIONS

PCT international Search Report, May 7, 2003, 5 pages.

(Continued)

*Primary Examiner*—Abdelmoniem Elamin
(74) *Attorney, Agent, or Firm*—Sheridan Ross P.C.

(57) ABSTRACT

A direct memory access (DMA) engine has virtually all control in connection with data transfers that can involve one or both of primary and secondary controllers. The DMA engine receives a command related to a data transfer from a processor associated with the primary controller. This command causes the DMA engine to access processor memory to obtain metadata therefrom. In performing a DMA operation, the metadata enables the DMA engine to conduct data transfers between local memory and remote memory. In performing exclusive OR operations, the DMA engine is involved with conducting data transfers using local memory.

20 Claims, 7 Drawing Sheets

U.S. PATENT DOCUMENTS

| | | | |
|---|---|---|---|
| 5,680,579 | A | 10/1997 | Young et al. |
| 5,696,922 | A | 12/1997 | Fromm |
| 5,790,775 | A | 8/1998 | Marks et al. |
| 5,812,754 | A | 9/1998 | Lui et al. |
| 6,061,822 | A * | 5/2000 | Meyer ..................... 714/758 |
| 6,094,699 | A | 7/2000 | Surugucchi et al. |
| 6,098,140 | A | 8/2000 | Pecone et al. |
| 6,151,641 | A * | 11/2000 | Herbert ..................... 710/22 |
| 6,157,955 | A | 12/2000 | Narad et al. |
| 6,185,634 | B1 | 2/2001 | Wilcox |
| 6,185,652 | B1 | 2/2001 | Shek et al. |
| 6,219,725 | B1 | 4/2001 | Diehl et al. |
| 6,230,240 | B1 | 5/2001 | Shrader et al. |
| 6,243,829 | B1 | 6/2001 | Chan |
| 6,272,533 | B1 | 8/2001 | Browne |
| 6,370,601 | B1 | 4/2002 | Baxter |
| 6,397,293 | B2 | 5/2002 | Shrader et al. |
| 6,421,769 | B1 | 7/2002 | Teitenberg et al. |
| 6,434,720 | B1 * | 8/2002 | Meyer ..................... 714/820 |
| 6,470,429 | B1 | 10/2002 | Jones et al. |
| 6,493,795 | B1 | 12/2002 | Arsenault et al. |
| 6,507,581 | B1 | 1/2003 | Sgammato |
| 6,732,243 | B2 * | 5/2004 | Busser et al. ............... 711/162 |
| 6,745,310 | B2 * | 6/2004 | Chow et al. ................. 711/170 |
| 6,801,958 | B2 | 10/2004 | Gugel |
| 6,839,788 | B2 | 1/2005 | Pecone |
| 2001/0013076 | A1 | 8/2001 | Yamamoto |
| 2002/0029319 | A1 | 3/2002 | Robbins et al. |
| 2002/0065998 | A1 | 5/2002 | Buckland |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2003/0065733 | A1 | 4/2003 | Pecone |
| 2006/0106982 | A1 * | 5/2006 | Ashmore et al. ........... 711/114 |

FOREIGN PATENT DOCUMENTS

| | | |
|---|---|---|
| EP | 0817054 A2 | 1/1998 |
| GB | 2396726 A | 4/2004 |
| GB | 2396463 | 6/2004 |
| GB | 2396725 | 6/2004 |
| JP | 2001142648 | 5/2001 |

OTHER PUBLICATIONS

European Examination Report for Application No. GB0406739.3, dated Nov. 10, 2004.
European Examination Report for Application No. GB0406742.7, dated Nov. 10, 2004.
U.S. Office Action for U.S. Appl. No. 09/967,027, Apr. 30, 2004, pp. 1-7 and cover sheet.
European Examination Report for Application No. GB0406740.1, dated Nov. 10, 2004.
Young et al., "A High I/O Reconfigurable Crossbar Switch" (2003) (abstract) 2 pages.
Landman and Rabaey, "Activity-sensitive architectural power analysis" (1996) (abstract) 5 pages.
European Examination Report for Application No. GB0411062.3, dated Aug. 20, 2004.
European Examination Report for Application No. GB0411062.3, dated Nov. 18, 2004.
European Examination Report for Application No. GB0406739.3, dated Nov. 29, 2005.
European Examination Report for Application No. GB0406740.1, dated Nov. 29, 2005.
European Examination Report for Application No. GB0406742.7, dated Nov. 29, 2005.
German Patent Office Action for German Patent Application No. 10297430.6-53, dated Oct. 10, 2006, 3 pages and 3 pages of English translation.
International Preliminary Examination Report for International (PCT) Patent Application No. PCT/US/02/30622, mailed Feb. 25, 2004.
International Preliminary Examination Report for International (PCT) Patent Application No. PCT/US02/30631, mailed Jun. 13, 2003.
International Preliminary Examination Report for International (PCT) Patent Application No. PCT/US02/30632, mailed May 6, 2003.
International Preliminary Examination Report for International (PCT) Patent Application No. PCT/US02/35460, mailed Feb. 5, 2004.
International Search Report for International (PCT) Patent Application No. PCT/US02/30631, mailed Mar. 18, 2003.
International Search Report for International (PCT) Patent Application No. PCT/US02/30632, mailed Mar. 7, 2003.
International Search Report for International (PCT) Patent Application No. PCT/US02/35460, mailed Dec. 31, 2002.
Written Opinion for International (PCT) Patent Application No. PCT/US02/35460, mailed Jul. 11, 2003.
U.S. Office Action for U.S. Appl. No. 09/967,126, Mar. 7, 2005, pp. 1-5 and cover sheet.
German Patent Office Action for German Patent Application No. 10297284.2-53, dated Nov. 18, 2005, 5 pages and 4 pages of English translation.
German Patent Office Action for German Patent Application No. 10297283.4-53, dated Nov. 18, 2005, 4 pages and 5 pages of English translation.
German Patent Office Action for German Patent Application No. 10297278.8-53, dated Nov. 18, 2005, 4 pages and 4 pages of English translation.
International Search Report for International (PCT) Patent Application No. PCT/US/02/30622,, mailed Dec. 12, 2002.

* cited by examiner

TRANSFERRING DATA USING DIRECT MEMORY ACCESS

CROSS-REFERENCE TO RELATED APPLICATIONS

This application is the U.S. national stage of International Application No. PCT/US02/35786, filed Nov. 7, 2002, which claims the benefit under 35 USC § 119(e) of U.S. Provisional Application Ser. No. 60/332,415, filed Nov. 9, 2001, both of which are incorporated herein by reference in their entirety.

FIELD OF THE INVENTION

The present invention relates to direct memory access engines, and more particularly, to a method and apparatus for transferring data between RAID controllers using a direct memory access engine.

BACKGROUND OF THE INVENTION

Redundant Arrays Of Inexpensive Disks (RAID) systems are well known systems which can help increase availability of stored data in network storage systems. Such systems typically include several hard disk drives which store data in such a way that, if one disk drive fails, data is still able to be recovered from the system. Such systems generally have a network storage bridge, which acts as an interface between a host computer and an array of disk drives. To further enhance the availability of data in such a system, it is common to have redundant storage controllers within the network storage bridge, such that if one controller fails, the remaining controller is able to continue read and write operations to the array of disk drives.

In a fully redundant storage bridge, user data has to be temporarily stored twice, once in a primary controller of data and once in its redundant or secondary counterpart. In this setup if the primary controller is damaged and unable to continue operation, the secondary redundant controller has a copy of the user data. Thus data is available if one controller fails, because either the primary or the secondary copy of the data will be delivered to its final destination, the array of disk drives.

Figure 1:
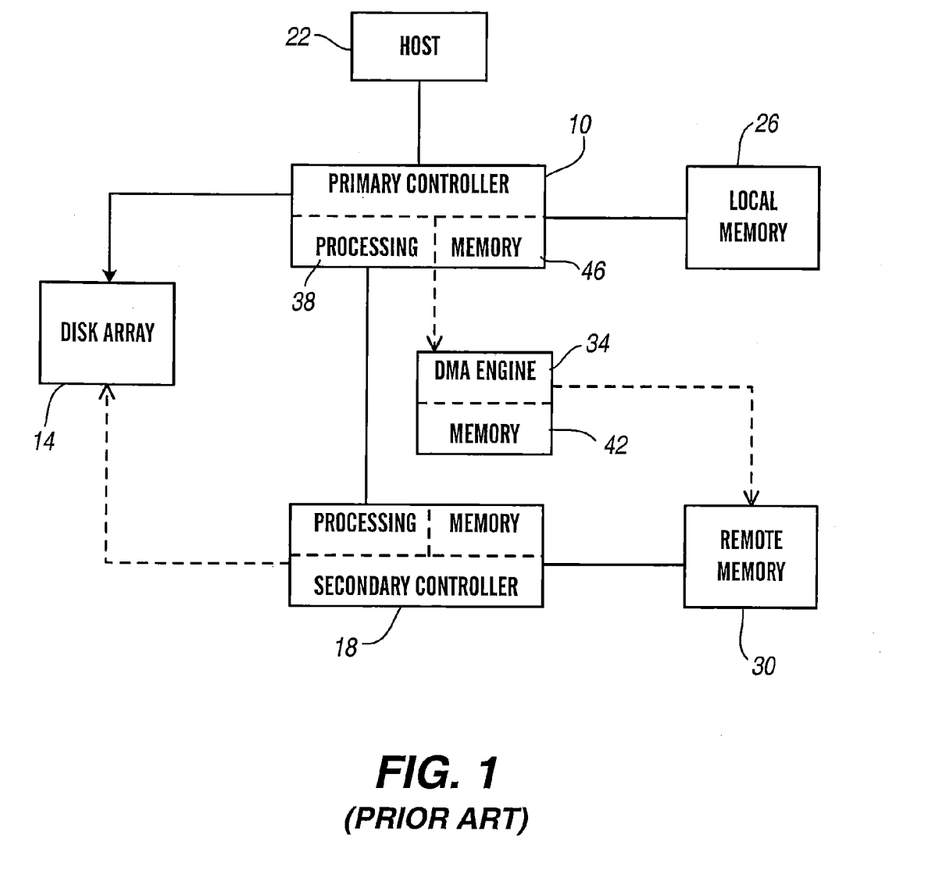
FIG. 1 is a block diagram illustrating a prior art system that includes primary and secondary controllers which can include and a DMA engine in connection with the storing of data.

Typically and with reference to the prior art drawing of FIG. 1, when a primary controller 10 receives user data to be stored in the disk array 14, it builds description tables in the process. These tables describe the data size, location and it's destination. The primary controller 10 then initiates a data transfer, known as a mirroring operation, in which the data is transferred to the secondary controller 18. Once the mirroring operation is complete, the primary controller 10 sends an indication to the host computer 22 that the data write is complete. Thus, the host computer 22 is notified that the data is stored, while the data may not be written to the disk array 14 for a period of time.

A traditional method for mirroring data between controllers is for the primary controller 10 to notify the secondary controller 18 that data is going to be mirrored. The primary controller 10 then transfers metadata to the secondary controller 18. The metadata is the data which is contained in the description tables. Following the metadata, the primary controller 10 transfers the user data to the secondary controller 18. The user data is stored in a local memory 26 associated with the primary controller 10 for transfer to a remote memory 30 associated with the secondary controller 18. In some cases, these transfers are initiated using direct memory access (DMA) and a DMA engine 34. In such a situation, a processing portion 38 within the primary controller 10 will give the DMA engine 34 a transfer command to transfer data from the primary controller 10 to the secondary controller 18. This transfer command typically includes the data contained in the description tables, which identifies the data which is to be transferred to the secondary controller 18. The processing portion 38 generally builds a DMA table containing the data from the description tables, which is able to be used by the DMA engine 34. This DMA table is then loaded into the DMA engine 34, with the transfer command. The DMA engine 34 receives the data from the processing portion 38, stores it in a memory 42 associated with the DMA engine 34, and then conducts the data transfer.

As can be seen, the processing portion 38 must build a DMA table, and transfer the table from the processing portion to the DMA engine 34. Thus, this data is stored in a memory 46 associated with the processing portion 38, configured into a form which is usable by the DMA engine 34, and then transferred and stored in the memory 42 associated with the DMA engine 34. It would be advantageous to reduce the amount of processing overhead involved in a mirroring transaction, thereby improving system performance. Accordingly, it would be advantageous to have a DMA engine which does not require a processing portion to create a DMA table. Furthermore, it would be advantageous to reduce internal memory required in a DMA engine, thereby reducing the silicon area required for such a DMA engine.

SUMMARY OF THE INVENTION

This invention allows a hardware based DMA engine to use the description tables stored in the processing portion directly to transfer data from the primary controller to the secondary controller through a dedicated, redundant set of data paths internal to the data bridge subsystem. Thus, the processing portion of the primary controller is not required to build a DMA table for use by the DMA engine. This transfer is accomplished via an internal data path from the primary controller to the secondary controller without ever leaving the storage bridge itself. Furthermore, the DMA engine uses the data tables as-is, without modification, thus reducing processor overhead. As the data is being transferred the tables are being updated and upon completion of a transfer, a completion status is posted to the processing portion. Since the DMA engine accesses the data table present in the processing portion memory, the processing portion does not have to load or build the table into the DMA memory. This access is accomplished independently of the processor portion thereby reducing processor overhead, as well as allowing for a reduced memory size for the DMA engine, saving silicon area for the chip containing the DMA engine.

The engine is also capable of XOR (exclusive OR) operations on the user data based on the same tables as the DMA transfer. In fact the XOR and DMA of the data can be performed concurrently, thus reducing overhead further.

The DMA engine of this invention thus results is a savings in gate count and silicon area required for its implementation, a reduction in CPU (central processing unit) processing time and thus reduction in command overhead, and reduction in software development time, since no additional data structures are needed for the DMA engine, which transfers data independently of the processor.

DETAILED DESCRIPTION

Figure 2:
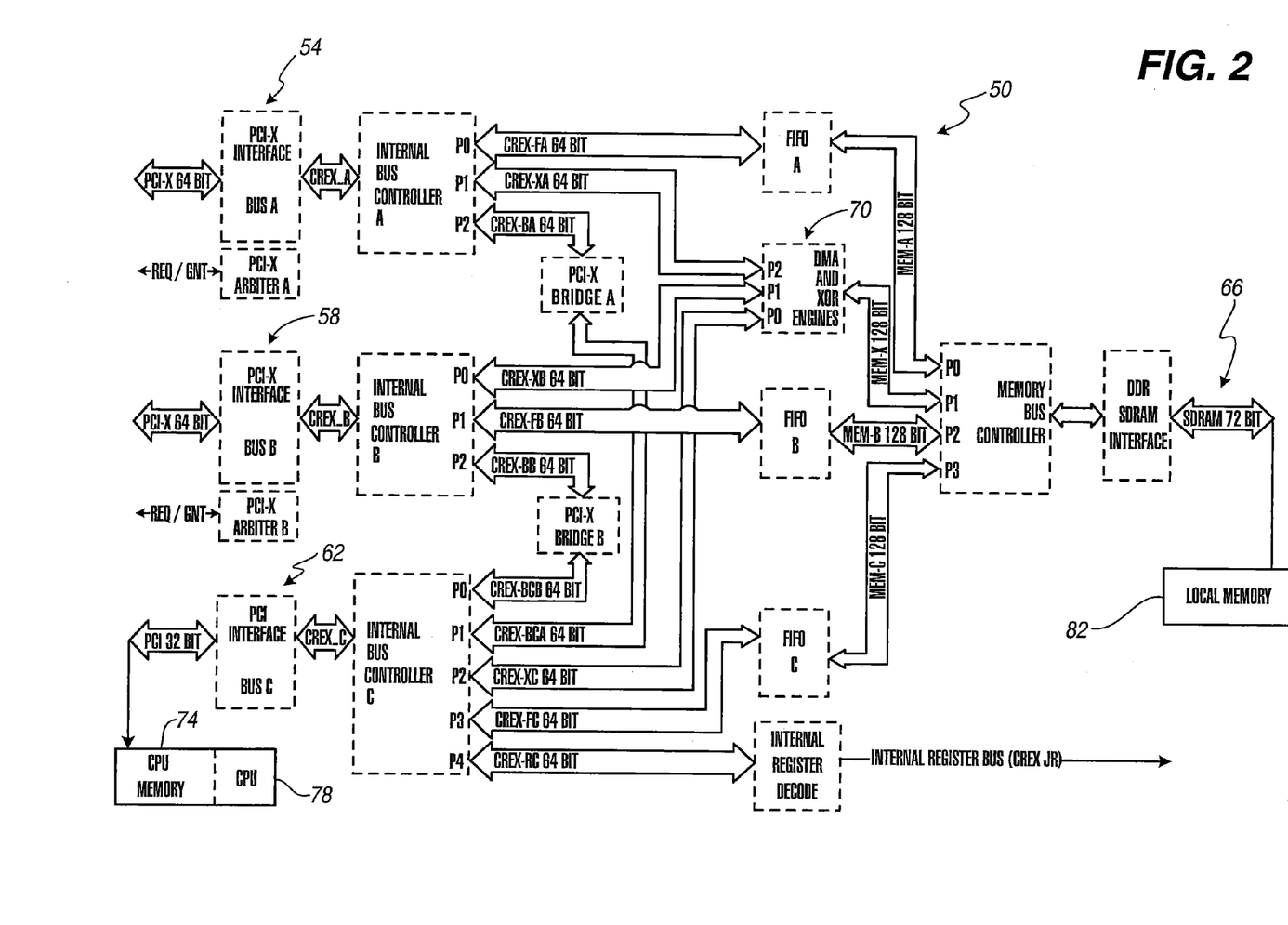
FIG. 2 is a block diagram of a controller with a DMA engine for performing DMA and/or XOR operations upon receiving a CPU command.

The invention is implemented as a module inside a memory controller 50. This device, illustrated in FIG. 2, moves data across four ports. Two multi-clients PCI-X ports 54, 58, one of which connects the primary controller 50 and the secondary controller (not shown), a CPU port 62 (PCI Interface Bus C) and a DDR-SDRAM port 66 for temporary and cache data storage. The DMA engine 70 is one of the internal modules of this device.

Figure 3:
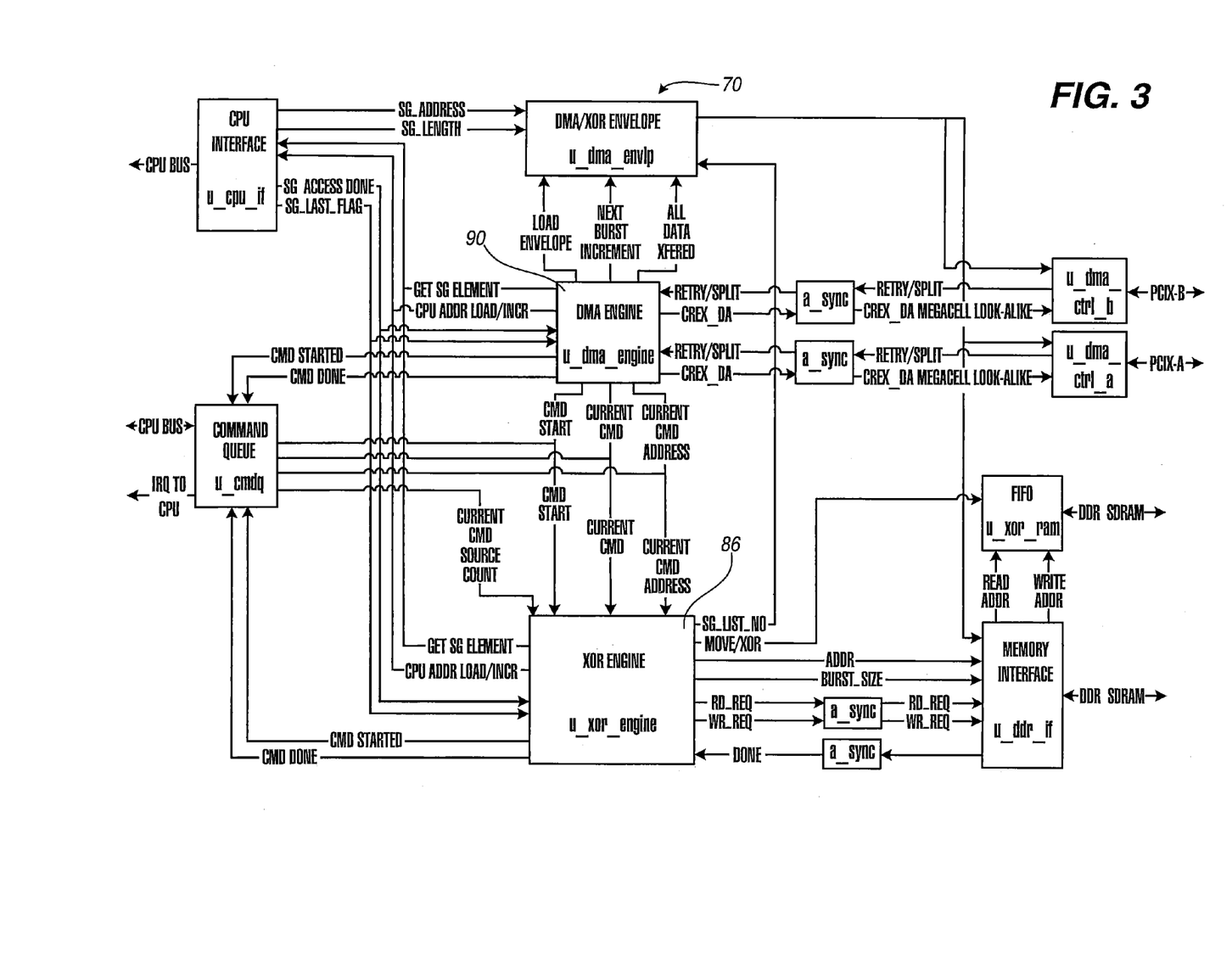
FIG. 3 is a block diagram of the DMA engine that includes a DMA engine portion and a XOR engine portion.

FIG. 3 illustrates the internal partitioning of the DMA engine 70. The DMA engine 70 is started by a CPU command issued via the CPU port 62. The CPU command includes the location of the data description table, located in the CPU memory 74. The command also includes instructions on the type of command to execute (DMA or XOR) and the PCI-X port 54, 58 to use for the DMA command. Once the command is received the DMA engine 70 reads the CPU memory based tables and performs data movement and manipulation without further CPU 78 assistance. As data is being processed, the DMA engine 70 updates (writes) the CPU tables to indicate how far the operation has progressed. The DMA engine 70 does not store the tables internally. Instead the CPU tables are periodically accessed through the dedicated CPU port 62 as more data is being transferred. This allows for reduced processor overhead, as the CPU 78 is not required to build a DMA table or load DMA transfer information into the DMA engine 70.

The data manipulated by the DMA engine 70 does not have to be contiguous. The CPU tables typically represent the scatter-gather nature of the RAID data storage (see FIGS. 3, 4 and 5). These tables tend to describe data in RAID chunks and these are the same tables that the DMA engine 70 uses to copy data across redundant controllers as well as XOR the data inside the primary controller 50 or the secondary controller.

Figure 4:
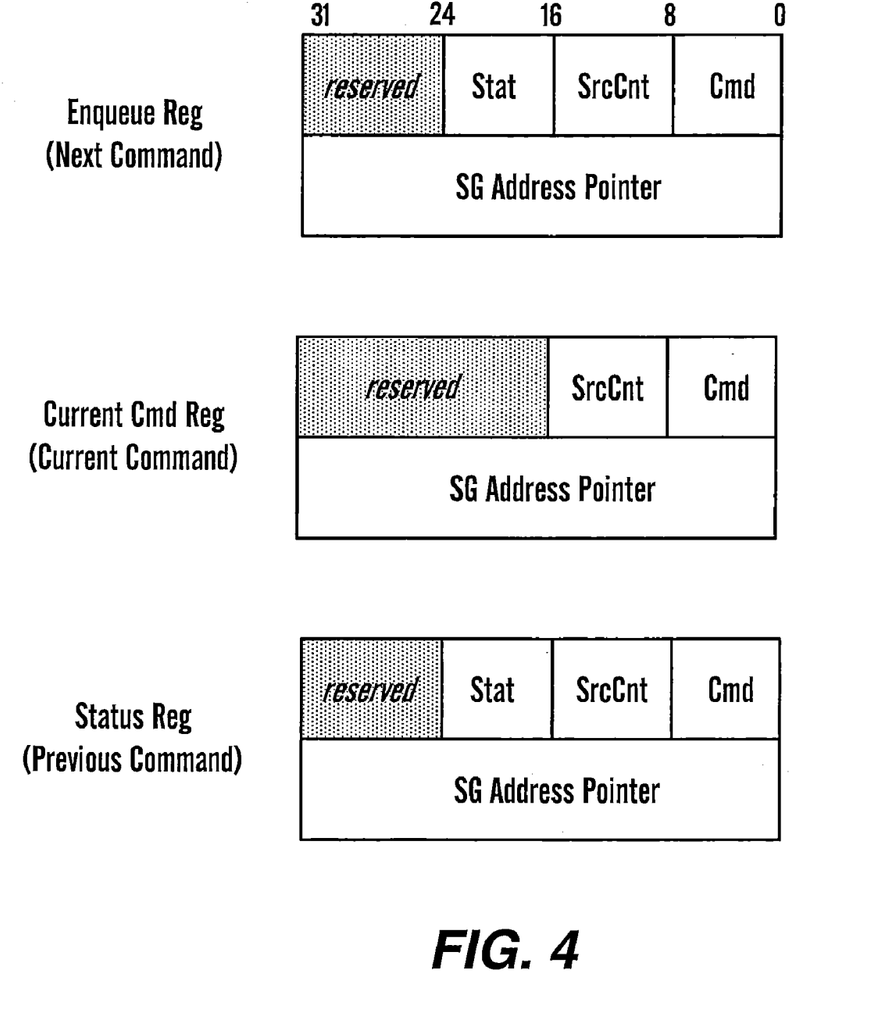
FIG. 4 illustrates a command queue associated with the DMA engine.
Figure 5:
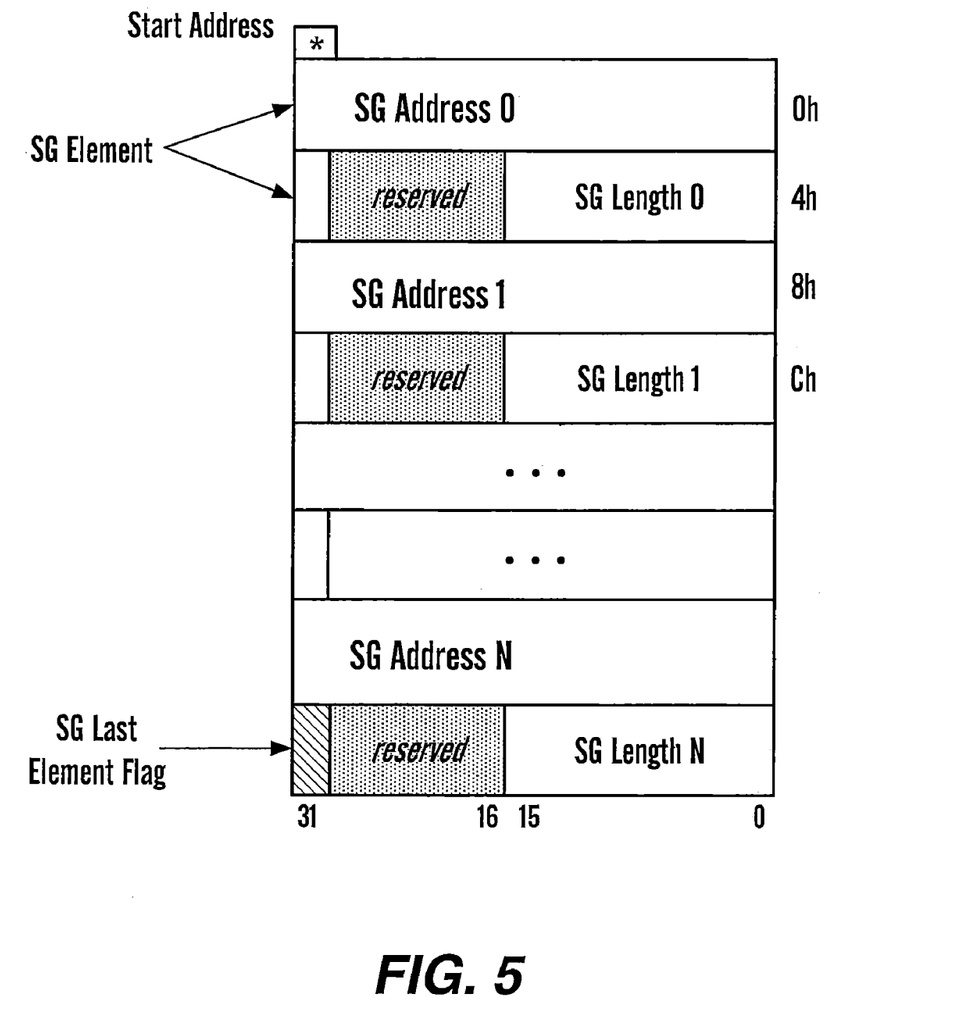
FIG. 5 illustrates a scatter-gather list structure.

The DMA table consists of destination entries only. Each table entry consists of sub-fields referred to as elements. Each element describes the location and the amount of data to copy. The "LAST" bit at the end of the source and destination tables instructs the DMA engine 70 to complete the operation.

The data copy table consists of source and destination entries. This command is designed to copy data inside the local controller memory 82. Each element describes the location and the amount of data to copy. The source table describes the locations and amounts of data located in the primary controller 50, the destination table describes the locations in the secondary controller to which the data has to be moved. The "LAST" bit at the end of the source and destination tables instructs the DMA engine 70 to complete the operation.

The XOR table resembles the data copy table, except it has multiple source tables. Data location and amount described by these source tables is XORed and the result is moved to the locations described by the destinations table. Again the "LAST" bit at the end of the source and destination table instructs the DMA engine 70 to complete the operation. In addition the "Source Count" field alerts the DMA engine 70 as to the number of source data pointers to XOR. Since the tables are not stored inside the DMA engine 70 itself, the theoretical number of sources is unlimited and does not impact the size of the DMA engine 70.

Once the DMA engine 70 operation has started, the system CPU 78 has an option to enqueue another command into the DMA engine 70 thus reducing command overhead to almost zero or alternatively to monitor the progress and wait for a command completion interrupt. Once the DMA engine 70 has completed all required data transfer, it issues a maskable interrupt and a status to the CPU 78 and ceases operation.

The DMA engine 70 has additional system benefits. It can be used to quickly initialize all memory to a predetermined data pattern. Another benefit of the DMA engine 70 is that it can be used to quickly check memory for errors, if a checksum or an ECC is used in conjunction with the temporary storage memory, as is the case in typical redundant systems.

Both the XOR engine portion 86 and the DMA engine portion 90 of the DMA engine 70 use common Scatter-Gather list structures. The S-G lists reside in the CPU memory 74 and the DMA engine 70 is responsible for extracting information from these lists and performing necessary data movement and manipulation. Unlike the S-G lists, the source of the actual user data being manipulated is always the local DDR-SDRAM user data buffer. Data transfer destination for XOR operations is also the local DDR-SDRAM memory 82. Data destination for DMA operations is either the PCI-XA port 54 or the PCI-XB port 58, depending on the command.

FIG. 4 is an illustration of the command queue for the DMA engine 70. Enqueueing and monitoring progress of XOR or DMA operations is performed via several command registers. Some control and status reporting is performed in the interrupt/status registers located in the interrupt control block. The enqueue register is used to issue commands. It is written with the type of command to be executed and its parameters. The current command register is a read only register which contains statuses of commands currently being executed. The status register is used to verify and acknowledge successful or unsuccessful command completion.

Within the command registers are several fields. The memory commands start immediately after the command (CMD) field of the enqueue register. Currently defined legal commands are:

01—XOR
02—DMA through PCI-X A bus
03—DMA through PCI-X B bus

All other values in this field are reserved.

The source count field (SrcCnt) defines the number of source scatter-gather (S-G) lists that the command is required to process. There is only one destination S-G list. The source count field is only relevant for XOR commands.

The DMA commands only use the one allowed destination list as both source and destination, and do not check the SrcCnt field. The current command register displays the current (live) source list number being processed. The S-G address pointer field is used to identify which S-G list structure is to be used for a given command. The field is presumably used as both a starting address of the list (when the command is enqueued) as well as a command identifier (when status register is examined). The current command register will always show a "live" version of the address pointing to the list currently being processed. Note that this address pointer is required to point to an existing address in the CPU memory range. The stat field reflects command initialization (start) and completion statuses. A value of "00" in the status register signifies that there are no statuses pending. Clearing the status field will automatically make the register available for the initialization/completion status of the next command. Note that clearing this bit also clears the interrupt associated with this command's initialization or completion, provided the interrupt is enabled.

The command progress register reflects the flow of the commands being enqueued, currently executed and completed. As commands are being enqueued, a CMD_ENQD bit in this register gets asserted to signify that there is a command that has been enqueued but has not yet started. This bit will continue to be asserted until the command starts. If no other command is being executed, this will occur immediately, however if there is another command in the queue being executed, the bit will stay ON until the previous command execution is completed. Another command can be enqueued only after the currently enqueued command has been started and this bit has been cleared by the hardware.

Once the command starts, the CMD_INPROG bit is asserted. At the same time a maskable "Command Started" interrupt is set. The significance of this event is that once this interrupt is set, another command can be enqueued. Again, this new command will stay enqueued until the current command execution is completed.

Upon completion of either the DMA or the XOR operation, the CMD_COMPL bit is asserted signifying that the command has completed all data movement and/or manipulation. If the command status register is empty (no previous command completion statuses are pending), assertion of this bit will be momentary. However, if the status register is busy, this bit will stay on signifying that the command is waiting to post its completion status as soon as the status register is available for posting.

The command status register contains a valid status when a maskable command completion interrupt is set. The CMD_STAT bit in the command progress register will also be set at the same time. Clearing status bits in the command status register clears both the interrupt and the CMD_STAT bit. It also makes the status register available for the next command completion status.

The S-G list structure is illustrated in FIG. 5. Each individual list consists of elements. Each element represents a starting address of a block of user data and the length of this data. The starting address can be anywhere in the 4 GB space. The length of a single element is currently limited to a maximum of 64 Kbytes size, although the DMA engine 70 can be reprogrammed to accept larger sizes. The S-G LAST element flag determines the number of elements in a S-G list. The flag is asserted by placing a '1' in bit 31 of the length field of the last S-G element.

Figure 6:
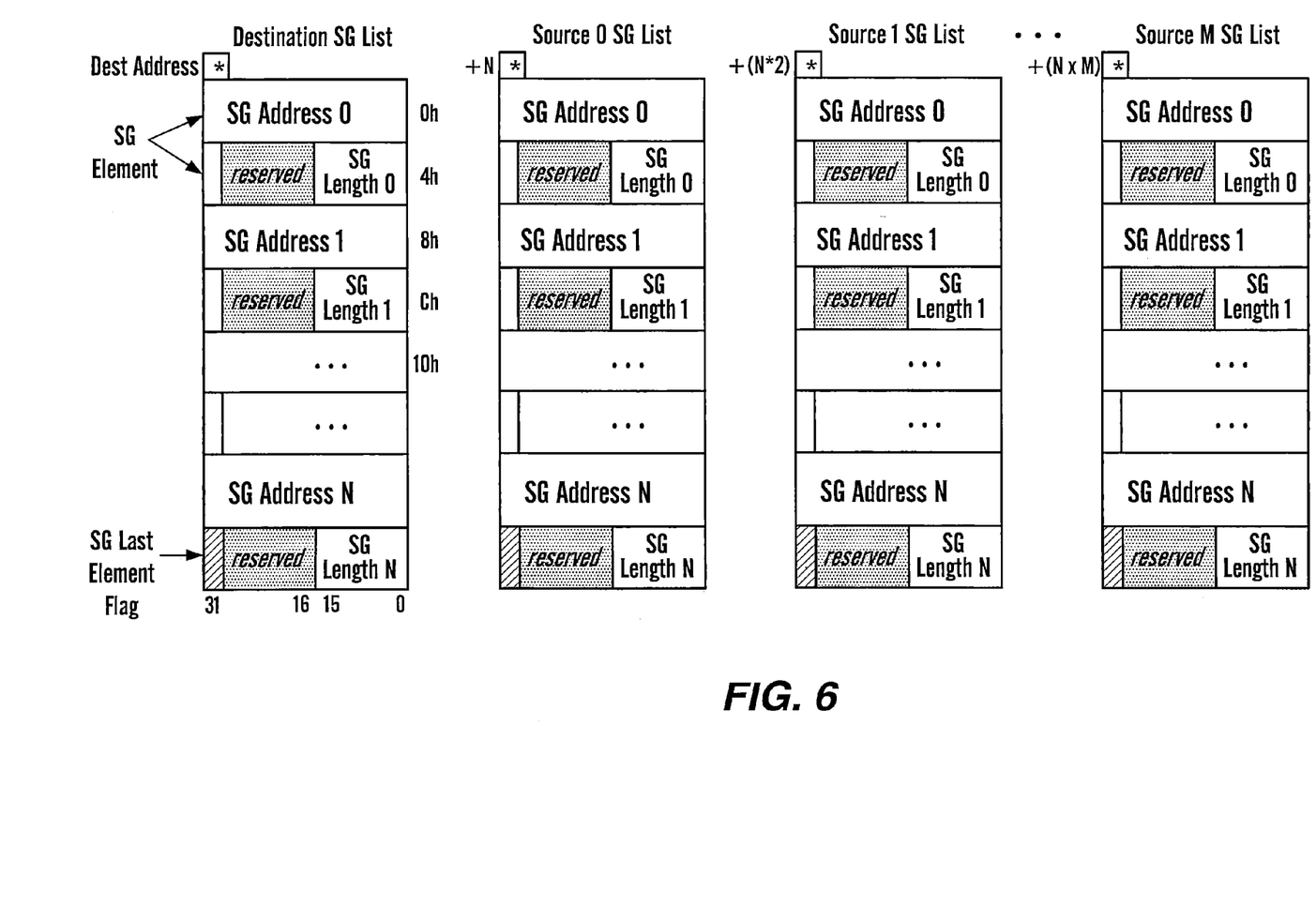
FIG. 6 illustrates scatter-gather lists associated with a XOR function.

FIG. 6 illustrates an XOR function capable of being completed using the DMA engine 70. The entire S-G list structure as used by the XOR operation follows. Only the first destination list is used for DMA operations. In this case it becomes both the destination and the source list. The source and the destination addresses may optionally differ by 1 GB (as defined by the DMA offset enable register). Destination address conversion is handled in hardware. The XOR engine portion 86 can also handle a unique case of a single source list. Although this operation is still initiated as an XOR command, in reality it performs a copy of user data from the source to the destination location. No actual XOR operation is performed. The data is moved from the source location in local DDR-SDRAM to a destination location in DDR-SDRAM memory. The data is not moved across either of the PCI-X buses.

Figure 7:
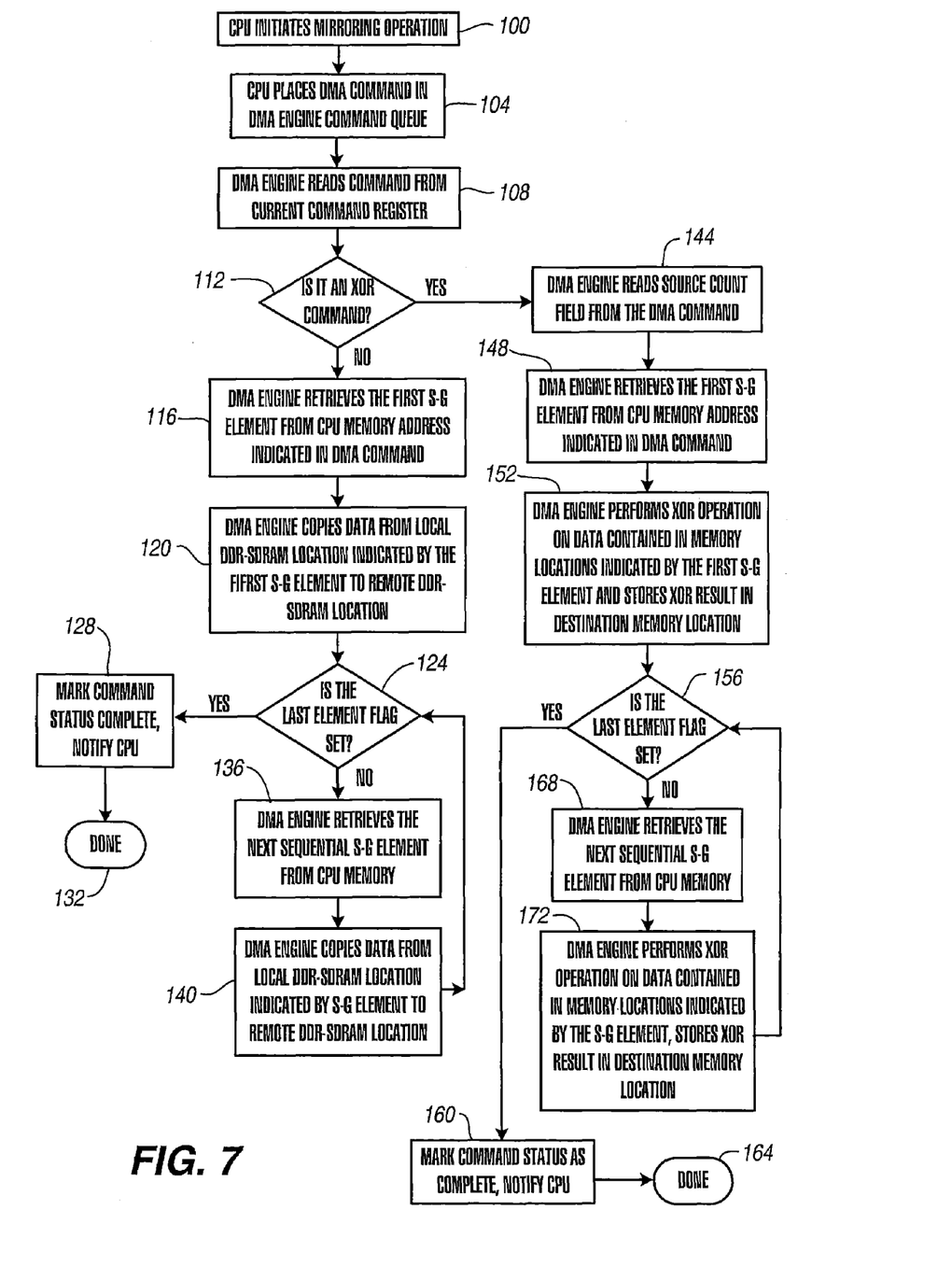
FIG. 7 is a flow diagram illustrating operations associated with the DMA engine.

FIG. 7 is a flow diagram illustration of the operation of a DMA engine 70 of one embodiment of the present invention. Initially, as noted by block 100, the CPU 78 initiates a mirroring operation. At block 104, the CPU 78 places a DMA command in the DMA engine 70 command queue. The DMA engine 70, when the DMA command is in the current command register, reads the current command, as noted by block 108. The DMA engine 70 determines if the command is an XOR command, as noted by block 112. If the command is not an XOR command, at block 116, the DMA engine portion 90 retrieves the first scatter/gather element from the CPU memory address indicated by the DMA command. The DMA engine portion 90 copies the data from the local DDR-SDRAM memory 82 location indicated by the first scatter/gather element to a remote DDR-SDRAM (not shown) location which corresponds to the location indicated by the first scatter/gather element, as noted by block 120.

At block 124, the DMA engine portion 90 determines if the last element flag is set in the scatter/gather element. If the last element flag is set, the DMA engine portion 90 marks the command status as complete in the command queue and sends a command complete message to the CPU 78, at noted by block 128. The mirroring operation is then complete, as noted by block 132. If at block 124 the DMA engine portion 90 determines that the last element flag is not set, the DMA engine portion 90 retrieves the next sequential scatter/gather element from CPU memory 74, as noted by block 136. The DMA engine portion 90, according to block 140, then copies data from the local DDR-SDRAM memory 82 location indicated by the scatter/gather element to a remote DDR-SDRAM location which corresponds to the location indicated by the scatter/gather element. The DMA engine portion 90 then repeats the operations associated with blocks 124 through 140.

If, at block 112, the DMA engine 70 determines that the DMA command is an XOR command, the XOR engine portion 86 of the DMA engine 70 reads the source count field from the DMA command register, as noted by block 144. The XOR engine portion 86 then, at block 148, retrieves the first scatter/gather element from the CPU memory address indicated in the DMA command. The XOR engine portion 86 performs XOR operations on the data contained in the memory locations which are determined from the memory location indicated by the first scatter/gather element and stores the XOR result in a destination memory location which is indicated by the memory location in the first scatter/gather element, as indicated by block 152. The XOR engine portion 86 then determines, at block 156, whether the last element flag is set in the scatter/gather element. If the last element flag is set, the XOR engine portion 86, at block 160, marks the command as complete in the command register and sends a notification to the CPU 78 that the command is complete. The XOR operation is then complete, as noted by block 164. If, at block 156, the XOR engine portion 86 determines that the last element flag is not set in the scatter/gather element, the XOR engine portion 86, at block 168, retrieves the next sequential scatter/gather element from CPU memory 74. The XOR engine portion 86, at block 171, performs XOR operations on the data contained in the memory locations which are determined from the memory location indicated by the scatter/gather element and stores the XOR result in a destination memory location which is indicated by the memory location in the scatter/gather element. The XOR engine portion 86 then repeats the operations associated with blocks 156 through 172.

The foregoing discussion of the invention has been presented for purposes of illustration and description. The description is not intended to limit the invention to the form disclosed herein. Variations and modifications commensurate with the above teachings, within the skill and knowledge of the relevant art, are within the scope of the present invention. The embodiment described hereinabove is further intended to explain the best mode presently known of practicing the invention and to enable others skilled in the art to utilize the invention in such embodiment, or in other embodiments, and with the various modifications required by their particular application or use of the invention. It is intended that the appended claims be construed to include alternative embodiments to the extent permitted by the prior art.

What is claimed is:

1. A method for processing data, comprising:
providing at least a first controller communicable with a remote memory, said first controller including a direct memory access (DMA) engine;
providing at least a processor communicating with a processor memory;
storing information using said processor with said processor memory related to data for processing, said information comprising a number of elements including at least a first element and a second element;
starting a process related to said information;
accessing firstly said processor memory using said DMA engine to obtain said first element, wherein said accessing firstly comprises said DMA engine retrieving the first element from the processor memory in a CPU table data format that is the same data format of said first element that was used when said first element was stored in said processor memory;
processing first data related to said first element;
accessing secondly said second element from said processor memory using said DMA engine after said step of processing said first data; and
processing second data related to said second element.

2. A method, as claimed in claim 1, wherein:
said step of accessing secondly is conducted independently of said processor.

3. A method, as claimed in claim 1, wherein:
at least said first controller is part of a first structure including a chip and said processor memory is external of said structure.

4. A method, as claimed in claim 1, wherein:
said starting step includes sending a command to said DMA engine.

5. A method for processing data, comprising:
providing at least a first controller communicable with a remote memory, said first controller including a direct memory access (DMA) engine;
providing at least a processor communicating with a processor memory;
storing information using said processor with said processor memory related to data for processing, said information comprising a number of elements including at least a first element and a second element;
starting a process related to said information;
accessing firstly said processor memory using said DMA engine to obtain said first element in a first data format;
processing first data related to said first element without changing the first element from the first data format;
accessing secondly said second element from said processor memory using said DMA engine after said step of processing said first data; and
processing second data related to said second element, wherein for each of said number of elements, said DMA engine accesses said processor memory without interrupting said processor and, for each of said accessing, a processing of data is conducted before another accessing is conducted of said processor memory using said DMA engine.

6. A method, as claimed in claim 1, wherein:
said processing first data includes copying said first data to said remote memory that is relatively remote from said DMA engine.

7. A method, as claimed in claim 1, wherein:
said processing first data includes performing a XOR operation.

8. A method for mirroring data from a local memory to a remote memory, comprising:
receiving a command at a direct memory access (DMA) engine;
retrieving by said DMA engine information from a memory location external to said direct memory access engine, wherein information retrieved from said memory location comprises a data format that is the same data format that was used when said information was stored in said memory location as CPU data; and
copying, based on said information contained in said memory location as CPU data, user data from a local memory location to a remote memory location.

9. A method, as claimed in claim 8, wherein:
said command is a CPU command related to at least one of a DMA operation and a XOR operation.

10. A method, as claimed in claim 8, further including:
determining using said DMA engine whether a DMA operation or a XOR operation is to be performed.

11. A method, as claimed in claim 8, wherein:
said information includes description data related to at least a location of said user data.

12. A method, as claimed in claim 8, wherein:
said memory location communicates with a CPU.

13. A method, as claimed in claim 8, wherein:
said information includes a number of scatter-gather elements that represent the scatter-gather nature of a data storage device.

14. A method, as claimed in claim 8, wherein:
said command is sent by a CPU and said copying step is conducted substantially independently of said CPU.

15. An apparatus for mirroring data in a storage system, comprising:
a local memory operable to store user data;
a remote memory operable to store user data;
a processor including a processor memory; and
a direct memory access (DMA) engine operable to retrieve description data from said processor memory and to copy said user data from said local memory to said remote memory based on said description data, wherein said description data is used by said DMA engine in the same format as said description data is stored on said processor memory.

16. An apparatus, as claimed in claim 15, wherein:
said DMA engine receives a command related to retrieving said description data and copying said user data from said processor and in which said command includes a location in processor memory related to said description data.

17. An apparatus for mirroring data in a storage system, comprising:
a local memory operable to store user data;
a remote memory operable to store user data;
a processor including a processor memory; and
a direct memory access (DMA) engine operable to retrieve description data from said processor memory and to copy said user data from said local memory to said remote memory based on said description data, wherein said description data is in a CPU table format, wherein said DMA engine includes at least one command register that has a plurality of fields including a command field related to at least one of an exclusive OR operation and a DMA operation and a source count field related to a number of scatter-gather lists.

18. An apparatus, as claimed in claim 17, wherein:
said at least one command register also includes a field related to the current source list number being processed and a field related to an address pointer that is used to identify at least one of said scatter-gather lists associated with said command.

19. An apparatus, as claimed in claim 15, wherein:
said DMA engine includes a DMA engine portion used in performing DMA operations and a XOR engine portion used in performing exclusive OR operations.

20. A method, as claimed in claim 1, further comprising:
determining whether an indicator is set in said first element indicating that a command has been completed;
in the event that said indicator is affirmatively set, performing at least the following:
 (i) completing said command; and
 (ii) sending a complete command message to said processor; and
in the event that said indicator is not affirmatively set, performing at least the following:
 (i) determining that said second element is related to said command; and
 (ii) processing said second element in connection with said command.

* * * * *